United States Patent [19]

Basinger

[11] 4,385,445
[45] May 31, 1983

[54] THICKNESS GAUGE

[75] Inventor: Harry A. Basinger, Hanover County, Va.

[73] Assignee: Reynolds Metals Company, Richmond, Va.

[21] Appl. No.: 311,502

[22] Filed: Oct. 15, 1981

[51] Int. Cl.³ .............................................. G01B 3/22
[52] U.S. Cl. .............................. 33/147 R; 33/172 R
[58] Field of Search ............ 33/147 R, 143 R, 147 E, 33/172 R, 174 A, 174 Q, 169 R

[56] References Cited

U.S. PATENT DOCUMENTS

| 1,966,618 | 7/1934 | Egorenkov | 33/172 |
| 2,160,723 | 5/1939 | Eldridge | 142/55 |
| 2,271,217 | 1/1942 | Allen et al. | 33/199 |
| 2,632,955 | 3/1953 | Samuelson | 33/172 |
| 2,734,275 | 2/1956 | Ring et al. | 33/147 R |
| 2,789,356 | 4/1957 | Blanks, Jr. | 33/168 |
| 3,269,019 | 8/1966 | Krohn | 33/169 |
| 3,403,446 | 10/1968 | Trnka | 33/147 R |
| 3,699,473 | 10/1972 | Paul | 33/172 R |
| 3,936,945 | 2/1976 | Jevremov | 33/172 R |

Primary Examiner—Willis Little
Attorney, Agent, or Firm—Lyne, Girard & McDonald

[57] ABSTRACT

A gauge for thickness measurement, being particularly adapted to measuring thickness within grooves, is disclosed. The gauge employs a reinforced blade as the groove entering element. This blade is designed to prevent penetration of the workpiece being measured, resulting in enhanced accuracy.

10 Claims, 3 Drawing Figures

THICKNESS GAUGE

BACKGROUND OF THE INVENTION

Gauges for thickness measurement purposes are commonly employed tools in many industries. Typically, such gauges include a pair of members which contact opposed sides of the workpiece being measured and a measurement readout device which provides a reading of the distance between the two elements, and thus a reading of the workpiece thickness.

It is often desired to determine "residual thickness". This term as used herein is meant to be the thickness of a portion of a workpiece which has had a groove or other similar indentation placed therein. For example, in forming easy-open metallic container ends, a scoreline is formed in a portion of the end and the residual score thickness is defined as the thickness of metal remaining within the scoreline. Accurate control of such thickness is necessary, since, if the residual score thickness is too great, there will be difficulty in opening the container. Conversely, if the residual score thickness is too small, premature failure of the score may occur, resulting in leakage.

When measuring residual thickness in grooves, a constraint often results from the narrow width of such grooves. For example, scorelines in container end walls often have widths in the order of 0.0015 inches (0.0038 centimeters). Additionally, such measurements must often be taken at positions of curvature, further limiting the ease of entering the groove. Thus, it has been common in the past to employ thickness gauges wherein the measurement element entering the groove comprised a thin, pointed element.

Accuracy problems arise when employing such a pointed measuring element. When measuring the thickness of workpieces formed from such materials as plastics, aluminum alloys and the like, which materials are fairly soft, penetration by the pointed measurement element of the workpiece could occur. Such penetration produces an inaccurately thin reading. For example, aluminuous metal container ends have score residual thickness in the order of 0.0045 inches (0.0114 centimeters). A 0.0002 inch (0.00051 centimeter) penetration of the workpiece in such a case results in approximately a 4.5% error.

It is thus the primary object of the present invention to provide a thickness gauge, especially designed for measuring residual thickness in grooves, in which the element entering the groove is designed to permit ease of entry at curved positions along the groove, and in which the groove entering element substantially reduces the chances for penetration of the workpiece, thereby increasing accuracy of the reading.

THE PRESENT INVENTION

By means of the present invention, this desired result may be obtained. The present invention comprises a thickness measuring gauge comprising a pair of workpiece contacting members and a means for determining and displaying the thickness of the workpiece, based upon the relative positions of the workpiece contacting members. One of the workpiece contacting members comprises a flexible blade having a workpiece contacting surface, a pair of flexible reinforcing blades and a pair of mounting brackets each having a curvalinear surface between which said workpiece contacting blade and said reinforcing blades are held. The workpiece contacting surface of the workpiece contacting blade is thus curved at its workpiece contacting point, permitting the blade to be positioned within curved portions of grooves. This workpiece contacting surface does not penetrate the workpiece, permitting increased accuracy in residual thickness readings.

BRIEF DESCRIPTION OF THE DRAWINGS

The thickness gauge of the present invention will be more fully described with reference to the drawings in which.

DETAILED DESCRIPTION OF THE PREFERRED EMBODIMENT

Figure 1:
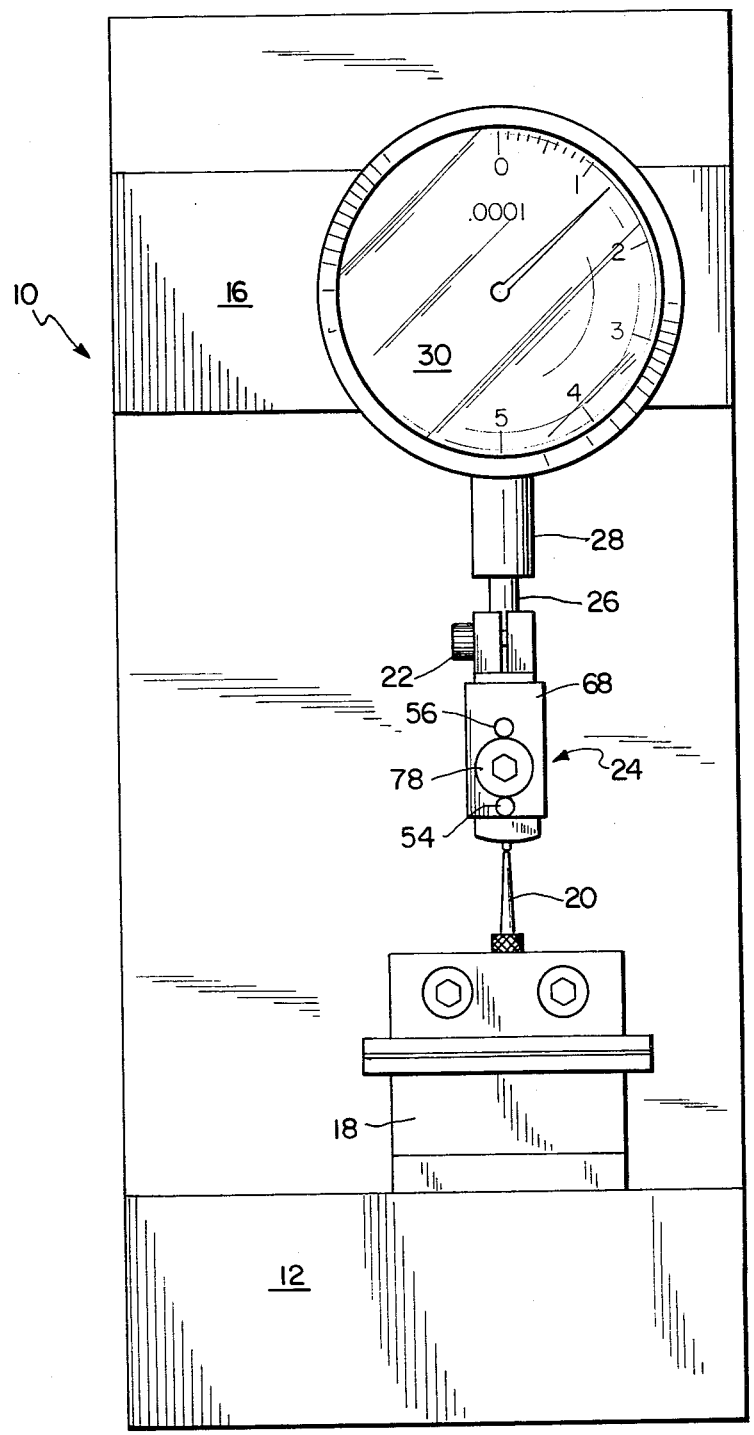
FIG. 1 is a front elevational view of the thickness gauge of the present invention.
Figure 2:
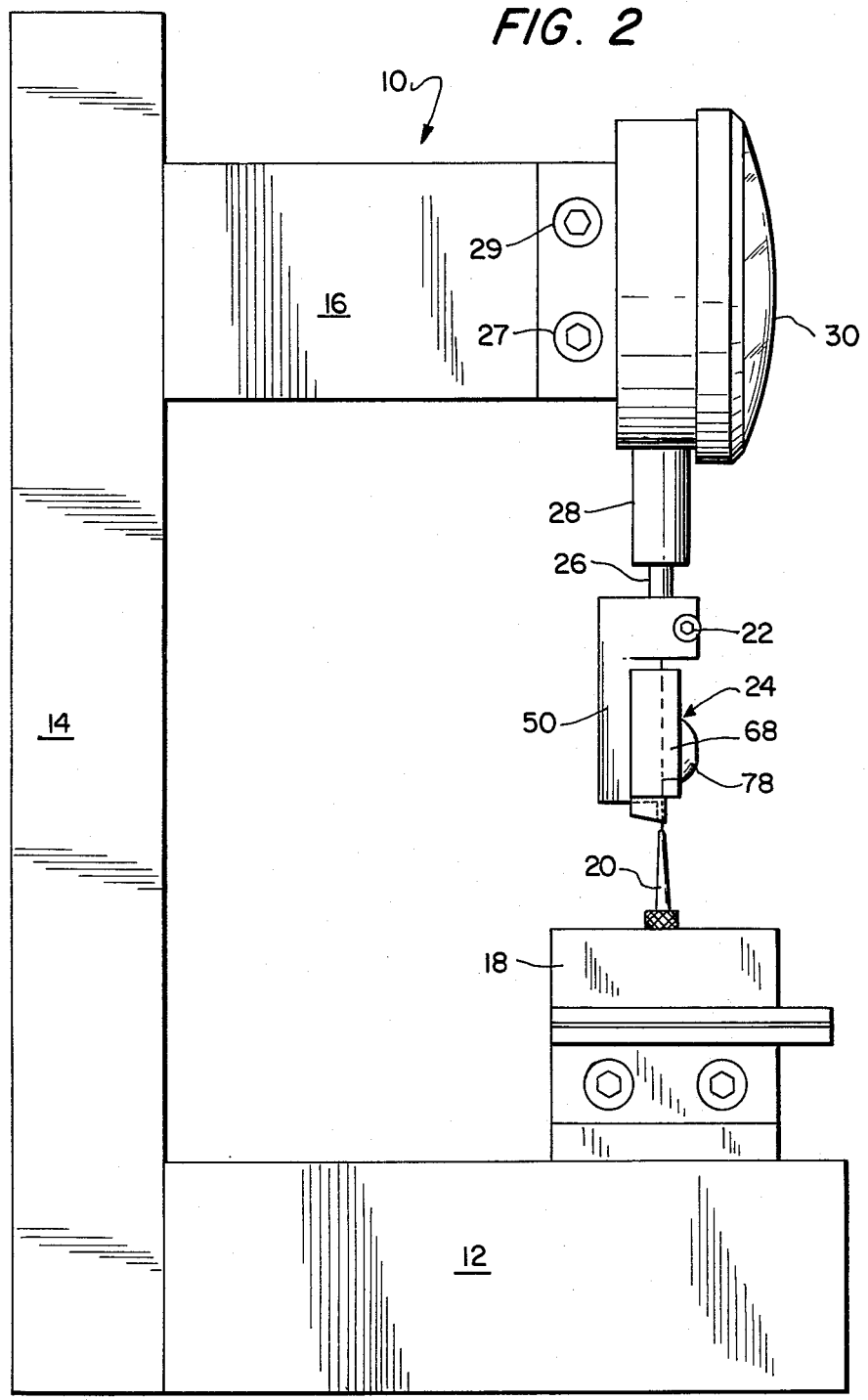
FIG. 2 is a side elevational view of the thickness gauge.

Turning to FIGS. 1 and 2, the thickness measuring gauge 10 of the present invention is illustrated. The gauge 10 includes supporting members 12, 14 and 16 to which the working components of the gauge 10 are attached. Attached to the base 12 is a support 18. This support 18 includes an upstanding workpiece contacting member 20 extending therefrom. The workpiece contacting member 20 has a generally rounded tip portion which contacts the workpiece being measured and is vertically fixed in position relative to the other measuring element 24, such that when a workpiece of a given known thickness is positioned between elements 20 and 24 the gauge 10 may be calibrated. The support 18 is horizontally adjustable, front to back and side to side, to permit centering of workpiece contacting member 20 to workpiece contacting member 24.

Attached to mounting 16 by means of mounting screws 27 and 29, or other similar means, are the upper portions of the gauge 10. Workpiece contacting member 24 is movable with respect to fixed member 20, with its movements causing movements in rod 26 and causing internal mechanical components, generally illustrated at 28, to give a reading on dial 30. Member 24 is the key element of the present invention and will be more fully described below. Element 24, including its respective portions 50, 68 and 78, is attached to rod 26 by means of mounting screw 22.

The operation of the internal portions 28 of the gauge 10 and the dial face 30 are conventional. Thus, for example, a Federal Model C-21 gauge is suited for the purposes of the present invention. Alternatively, the internal members 28 and dial face 30 may be replaced with an electronic means and digital readout unit.

As previously mentioned, the makeup of the movable workpiece contacting member 24 forms the basis of the present invention. In the past, such members, in order to be capable of entering such small regions as scorelines of can ends, comprised pointed elements. These elements, when used in conjunction with a back-up workpiece contacting member 20, tended to penetrate workpieces, resulting in inaccurate readings. The workpiece contacting member 24 of the present invention, eliminates this problem by eliminating the pointed member.

Figure 3:
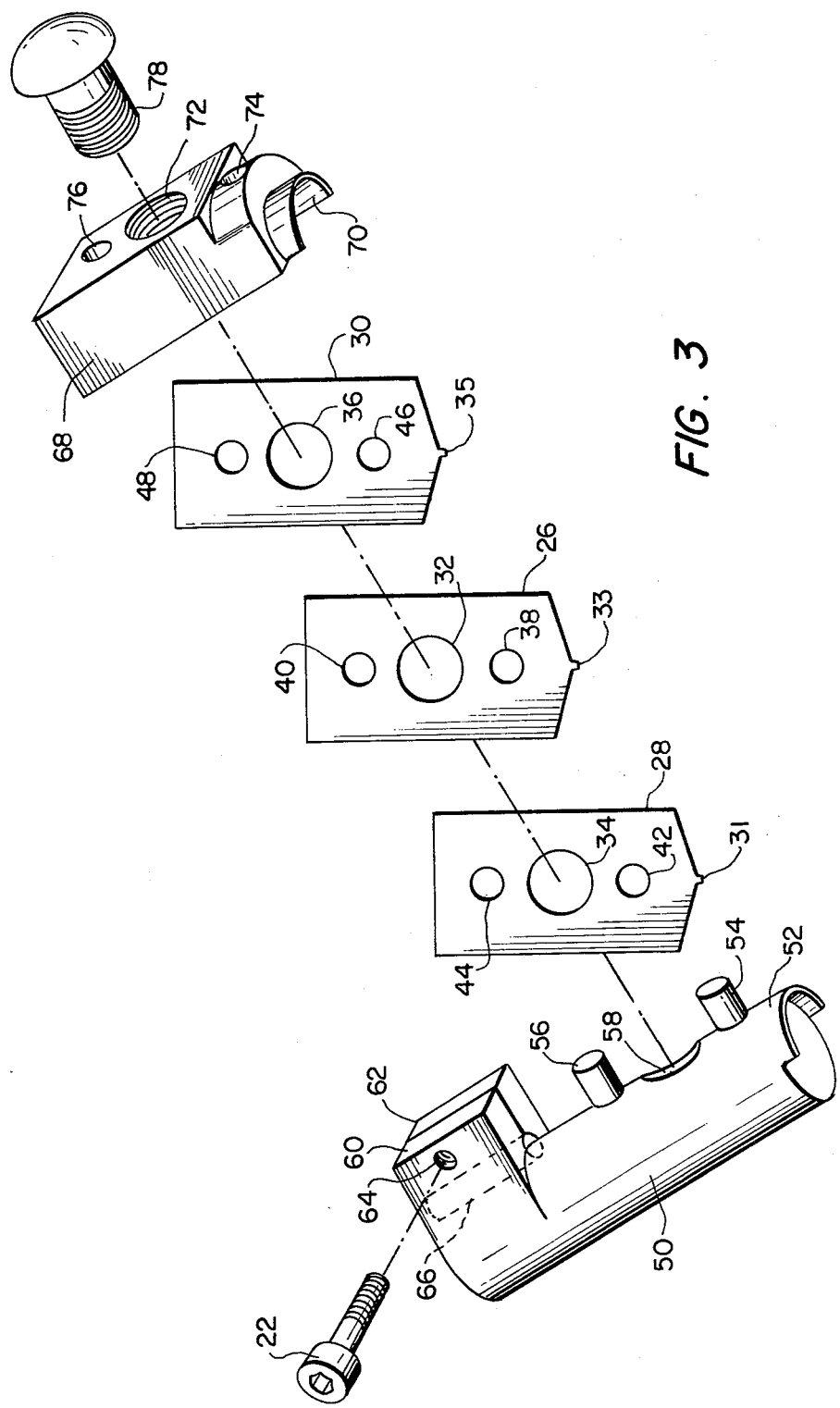
FIG. 3 is an exploded view of the workpiece contacting blade and its associated elements.

Looking now at FIG. 3, the workpiece contacting member 24 is shown prior to assembly. A base mounting bracket 50 has a curvilinear surface 52 upon which workpiece contacting blades may be mounted. Extending from surface 52 are a pair of alignment pins 54 and 56 and a threaded opening 58, enabling completion of assembly. The bracket 50 may be attached to the movable bar 26 of gauge 10 by means of aperture 66 and slots 60 and 62, having a threaded opening 64 therein. When member 50 is placed upon bar 26, screw 22 is tightened, forcing sloted members 60 and 62 together, and thus decreasing aperture 66 and enabling bracket 50 to firmly hold onto rod 26.

Mounted upon alignment pins 54 and 56 are three blades 28, 26, and 30. Blades 28, 26 and 30 include apertures 42 and 44, 38 and 40, and 46 and 48 respectively which permit these blades 28, 26 and 30 to be mounted upon pins 54 and 56 for alignment. Blades 28, 26 and 30 also include appatures 34, 32 and 36 respectively to permit screw 78 to pass therethrough and into threaded opening 58 in base 50.

A cover plate bracket 68 includes a curvilinear surface 70 having the same curvilinear formation as surface 52, alignment openings 74 and 76 and assembly opening 72 through which screw 78 may pass.

As is quickly recognized, when blades 28, 26 and 30 are mounted between base 50 and coverplate 68, the blades 28, 26 and 30 will take the same curvilinear shape as surfaces 52 and 70. The radius of surfaces 52 and 70 is chosen to permit entry of member 24 into curved regions, such as the curves along a score line of a can end. Such curves are required, since, rather than the point contact of previous pointed workpiece contacting members, there will be a line of contact when using the blades 28, 26 and 30. Typically, the radius of surfaces 52 and 70 may range between about 0.100 to 0.800 inches (0.254 to 2.032 centimeters). The choice of radius for a given guage 10 will be determined by the curve of the groove being measured at its measurement point.

Blades 28, 26 and 30 are thin, metallic blades formed of such materials as sheet steel and the like. Back-up blades 28 and 30 may have a thickness, for example, of about 0.002 inches (0.00508 centimeters) and central blade 26 may have a thickness of about 0.001 inches (0.00254 centimeters). Clearly, with these thicknesses, the blades 28, 26 and 30 will conform to the radius of the surfaces 52 and 70 when locked between base bracket 50 and coverplate bracket 68.

When assembled, the lower surfaces of the blades 28, 26 and 30 extend slightly below surfaces 52 and 70. The lower surfaces of blades 28, 26 and 30, as illustrated, taper to nibs 31, 33 and 35 respectively. Blade 26, which is the workpiece contacting member, has a nib 33 which extends, for example, 0.005 inches (0.0127 centimeters) beyond nibs 31 and 35. Blades 28 and 30 are, therefore, back-up or ridgifing blades for the workpiece contacting blade 26. This nib 33, as well as nibs 31 and 35, which are on the same radius as surfaces 52 and 70, forms a curvilinear workpiece contacting surface which may enter the curves encountered within a scoreline of a can end. However, as is readily apparent, nib 33 may rest upon a surface, rather than entering a score or indentation, and give an accurate reading.

Since nib 33 has a flat or somewhat rounded workpiece contacting surface, there is no sharp point which can gouge into the workpiece and cause inaccurate readings.

Alternatively, the tapered and nibbed bottom surface of blades 28, 26 and 30 may be replaced with a generally arculate bottom surface, with the radius of such a surface for blade 26 being in the order of 0.005 inches (0.0127 centimeters) greater than that of back-up blades 28 and 30.

The gauge 10 is illustrated in an upright position. However, it is preferred that the guage 10 rest upon its side when in use, with the workpiece being held between workpiece contacting members 20 and 24, rather than resting upon member 20.

From the foregoing, it is clear that the present invention provides an apparatus for accurate measurement of workpiece thickness by eliminating the possibility of penetration of the workpiece by the workpiece contacting members.

While the invention has been described with reference to certain specific embodiments thereof, it is not intended to be so limited thereby, except as set forth in the accompanying claims.

I claim:

1. In a guage for measuring the thickness of a workpiece comprising a pair of workpiece contacting members and means for determining the distance between said workpiece contacting members and thus the thickness of said workpiece, the improvement wherein one of said workpiece contacting members comprises a flexible workpiece contacting blade having a workpiece contacting surface, a pair of flexible reinforcing blades surrounding said workpiece contacting blade and a pair of mounting brackets, said mounting brackets having curvalinear surfaces between which said workpiece contacting blade and said reinforcing blades are held, said workpiece contacting blade and said reinforcing blades conforming to said curvalinear surfaces of said mounting brackets.

2. The apparatus of claim 1 wherein one of said mounting brackets includes alignment pins and said other mounting bracket and said workpiece contacting blade and said reinforcing blades include alignment apertures.

3. The apparatus of claim 1 wherein said workpiece contacting blade and said reinforcing blades include nibs on one end thereof, said nib of said workpiece contacting blade forming the workpiece contacting surface thereof.

4. The apparatus of claim 3 wherein said nib of said workpiece contacting blade extends about 0.005 inches (0.0127 centimeters) beyond the nibs of said reinforcing blades.

5. The apparatus of claim 1 wherein said workpiece contacting blade and said reinforcing blades include an arcuate surface at one end thereof, said arcuate surface of said workpiece contacting blade forming the workpiece contacting surface thereof.

6. The apparatus of claim 5 wherein said arcuate surface of said workpiece contacting blade extends about 0.005 inches (0.0127 centimeters) beyond said arcuate surfaces of said reinforcing blades.

7. The apparatus of claim 1 wherein said workpiece contacting blade has a thickness of about 0.001 inches (0.00254 centimeters) and said reinforcing blades have a thickness of about 0.002 inches (0.00508 centimeters).

8. The apparatus of claim 1 wherein said curvalinear surfaces of said mounting brackets have a radius of between about 0.100 and 0.800 inches (0.254 and 2.032 centimeters).

9. The apparatus of claim 1 wherein said means for determining the distance between said workpiece contacting members comprises mechanical means and a dial face.

10. The apparatus of claim 1 wherein said means for determining the distance between said workpiece contacting members comprises electronic means and a digital readout.

* * * * *